(12) United States Patent
Ng et al.

(10) Patent No.: US 11,168,540 B2
(45) Date of Patent: Nov. 9, 2021

(54) FLOW TUBE POSITION SENSOR AND MONITORING FOR SUB SURFACE SAFETY VALVES

(71) Applicant: Halliburton Energy Services, Inc., Houston, TX (US)

(72) Inventors: Shaun Wen Jie Ng, Singapore (SG); Bruce Edward Scott, McKinney, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 168 days.

(21) Appl. No.: 16/609,415

(22) PCT Filed: Dec. 3, 2018

(86) PCT No.: PCT/US2018/063584
§ 371 (c)(1),
(2) Date: Oct. 29, 2019

(87) PCT Pub. No.: WO2020/117187
PCT Pub. Date: Jun. 11, 2020

(65) Prior Publication Data
US 2021/0115759 A1    Apr. 22, 2021

(51) Int. Cl.
*E21B 34/12* (2006.01)
*E21B 47/092* (2012.01)
(Continued)

(52) U.S. Cl.
CPC ............ *E21B 34/12* (2013.01); *E21B 34/066* (2013.01); *E21B 34/10* (2013.01); *E21B 47/092* (2020.05);
(Continued)

(58) Field of Classification Search
CPC ........ E21B 34/12; E21B 34/10; E21B 34/066; E21B 2200/05; E21B 2200/06; E21B 47/092; E21B 47/12; G01D 5/145
See application file for complete search history.

(56) References Cited

U.S. PATENT DOCUMENTS

| 5,666,050 | A | 9/1997 | Bouldin et al. |
| 7,451,809 | B2 | 11/2008 | Noske et al. |

(Continued)

OTHER PUBLICATIONS

Netherlands Official Action and Search Report for Application No. NL2024092 dated May 18, 2020.
(Continued)

*Primary Examiner* — Christopher J Sebesta
(74) *Attorney, Agent, or Firm* — Scott Richardson; C. Tumey Law Group PLLC

(57) ABSTRACT

A well safety valve, comprising: a first sub assembly, wherein the first sub assembly comprises: an outer housing having a central bore extending axially through the outer housing, wherein the outer housing comprises an outer wall having a receptacle formed in the outer wall; a piston disposed in the receptacle; a rod, wherein the rod is disposed at an end of the piston, wherein a first magnetic sleeve is disposed around the rod; a flow tube disposed in the central bore of the outer housing, wherein the flow tube comprises a second magnetic sleeve on an exterior surface of the flow tube; and a valve member disposed in the outer housing; and one or more magnetic sensors disposed in the outer housing between the first magnetic sleeve and the second magnetic sleeve; and a second sub assembly, wherein the second sub assembly is coupled to the first sub assembly.

20 Claims, 5 Drawing Sheets

(51) Int. Cl.
*E21B 34/06* (2006.01)
*E21B 34/10* (2006.01)
*E21B 47/12* (2012.01)
*G01D 5/14* (2006.01)

(52) U.S. Cl.
CPC ............ *E21B 47/12* (2013.01); *G01D 5/145* (2013.01); *E21B 2200/05* (2020.05)

(56) References Cited

U.S. PATENT DOCUMENTS

| | | | |
|---|---|---|---|
| 7,640,989 B2* | 1/2010 | Williamson, Jr. | E21B 34/066 166/332.8 |
| 8,237,443 B2 | 8/2012 | Hopmann et al. | |
| 8,573,304 B2 | 11/2013 | Vick, Jr. et al. | |
| 10,138,710 B2 | 11/2018 | Noske | |
| 2006/0157240 A1 | 7/2006 | Shaw et al. | |
| 2007/0137869 A1 | 6/2007 | MacDougall et al. | |
| 2009/0128141 A1 | 5/2009 | Hopmann et al. | |
| 2012/0032099 A1* | 2/2012 | Vick, Jr. | F16K 31/086 251/65 |
| 2012/0067594 A1 | 3/2012 | Noske et al. | |
| 2012/0125597 A1* | 5/2012 | Vick, Jr. | E21B 34/066 166/66.5 |
| 2013/0341034 A1 | 12/2013 | Biddick et al. | |
| 2014/0077964 A1* | 3/2014 | Beligere | E21B 47/06 340/853.3 |
| 2014/0083689 A1 | 3/2014 | Streich et al. | |
| 2015/0211332 A1* | 7/2015 | Noske | E21B 34/14 166/66.5 |
| 2017/0130557 A1* | 5/2017 | Pratt | F16K 31/0668 |
| 2017/0241258 A1* | 8/2017 | Scott | E21B 47/092 |
| 2018/0328145 A1 | 11/2018 | Gonzalez et al. | |

OTHER PUBLICATIONS

ISRWO International Search Report and Written Opinion for PCT/US2018/063584 dated Aug. 23, 2019.

* cited by examiner

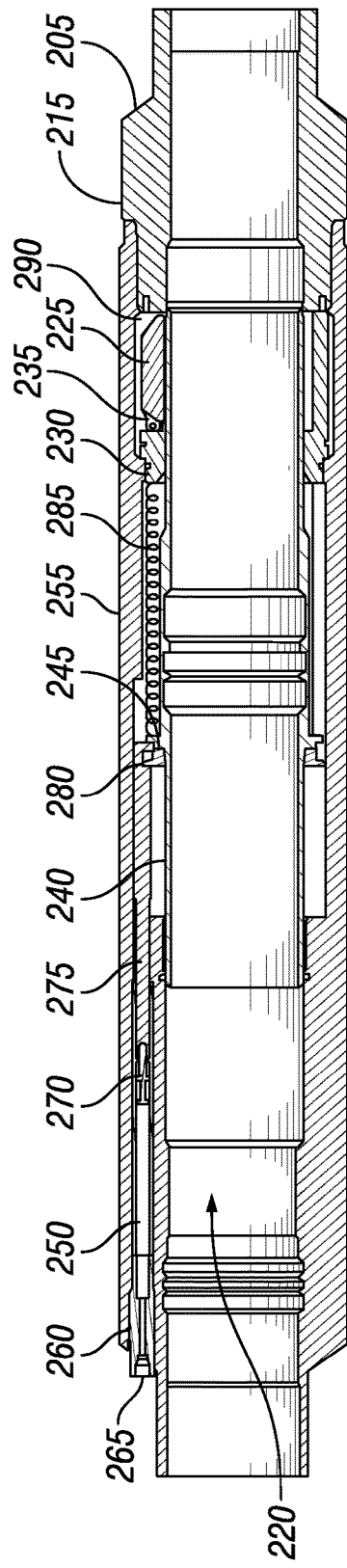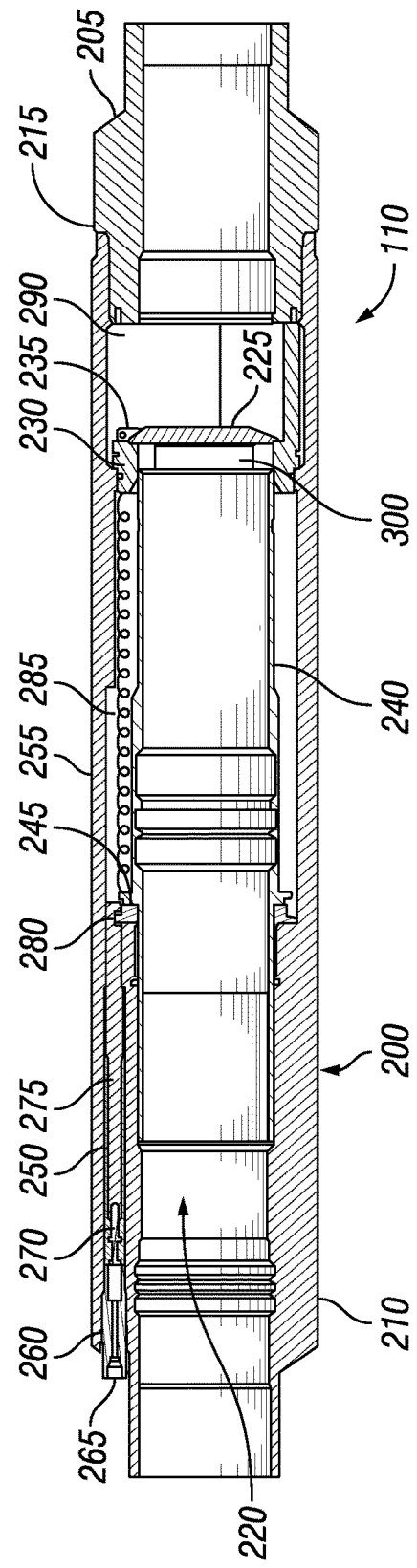

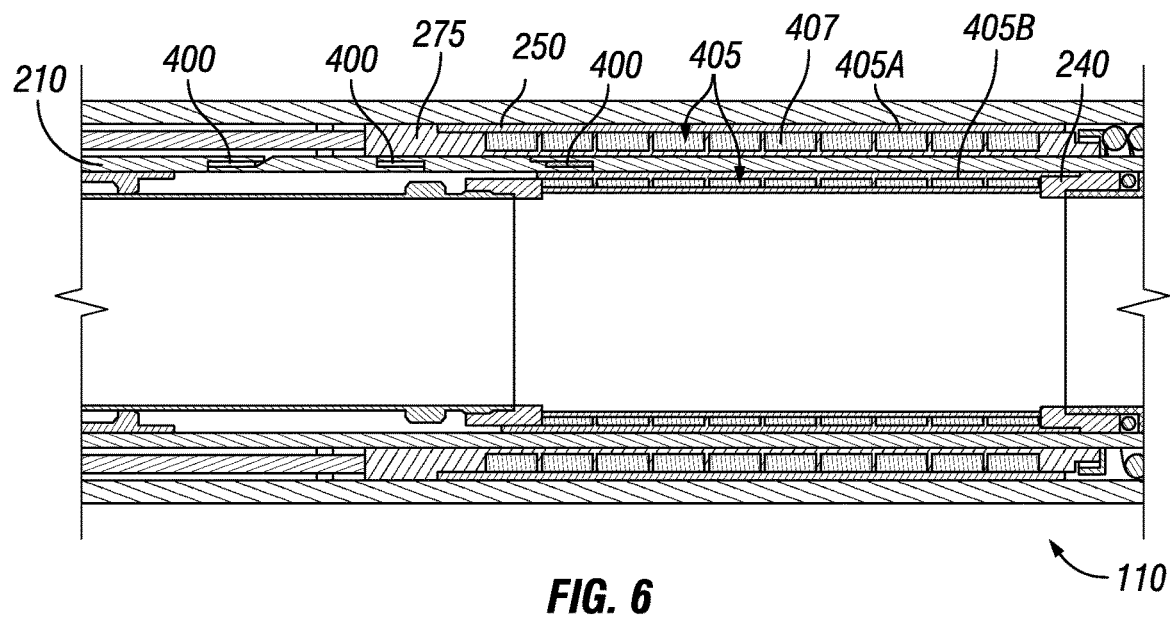
FIG. 6
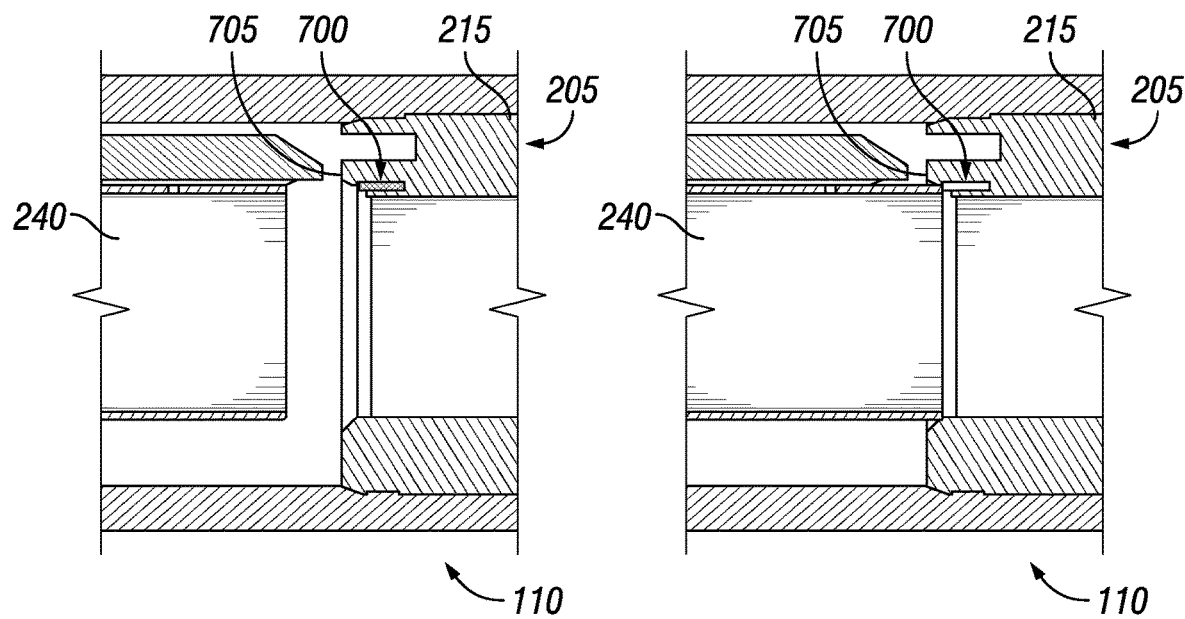
FIG. 7   FIG. 8

FLOW TUBE POSITION SENSOR AND MONITORING FOR SUB SURFACE SAFETY VALVES

BACKGROUND

Wells may be drilled at various depths to access and produce oil, gas, minerals, and other naturally-occurring deposits from subterranean geological formations. Wells may also be drilled in a variety of environments, including in deep water where ocean floor conditions may be softer or more unconsolidated for desired when drilling. As a precaution, well safety valves may be installed in a wellbore to prevent uncontrolled release of reservoir fluids from the well.

Typically, an operator on-site may not be aware of the actual position of a flow tube within the safety valve. A sudden pressure spike in the hydraulic control line pressure gauge may be the only indicator to confirm the location of the flow tube (i.e., when the flow tube is fully open). This indication may not be accurate as there are various factors that may affect the operation of the safety valve. As such, real-time monitoring of the location of the flow tube may provide an advantage over the traditional way of monitoring the safety valve.

BRIEF DESCRIPTION OF THE DRAWINGS

These drawings represent certain aspects of the present invention and should not be used to limit or define the disclosure.

FIG. 2 illustrates an example of a safety valve in an open position;

FIG. 3 illustrates an example of a safety valve in a closed position;

FIG. 6 illustrates an example of a safety valve in an open position with a magnetic sensor;

FIG. 7 illustrates an example of a safety valve in an open position with a piezoelectric sensor in a second sub assembly;

FIG. 8 illustrates an example of a safety valve in a bottomed-out position actuating a piezoelectric sensor in a second sub assembly;

DETAILED DESCRIPTION

The present examples relate to subterranean operations and, more particularly, to well safety valves. Disclosed herein are design features that may be beneficial over current available well safety valves, such as a magnet sensor and magnetic sleeve combination and a piezoelectric sensor. In examples, the magnet sensor may monitor the displacement of a magnetic sleeve, wherein the magnetic sleeve comprises a plurality of magnets, disposed on the flow tube. In other examples, a piezoelectric sensor may be placed at a certain location within the safety valve to provide an indication of the location of the flow tube when the flow tube has displaced against the piezoelectric sensor.

Figure 1:
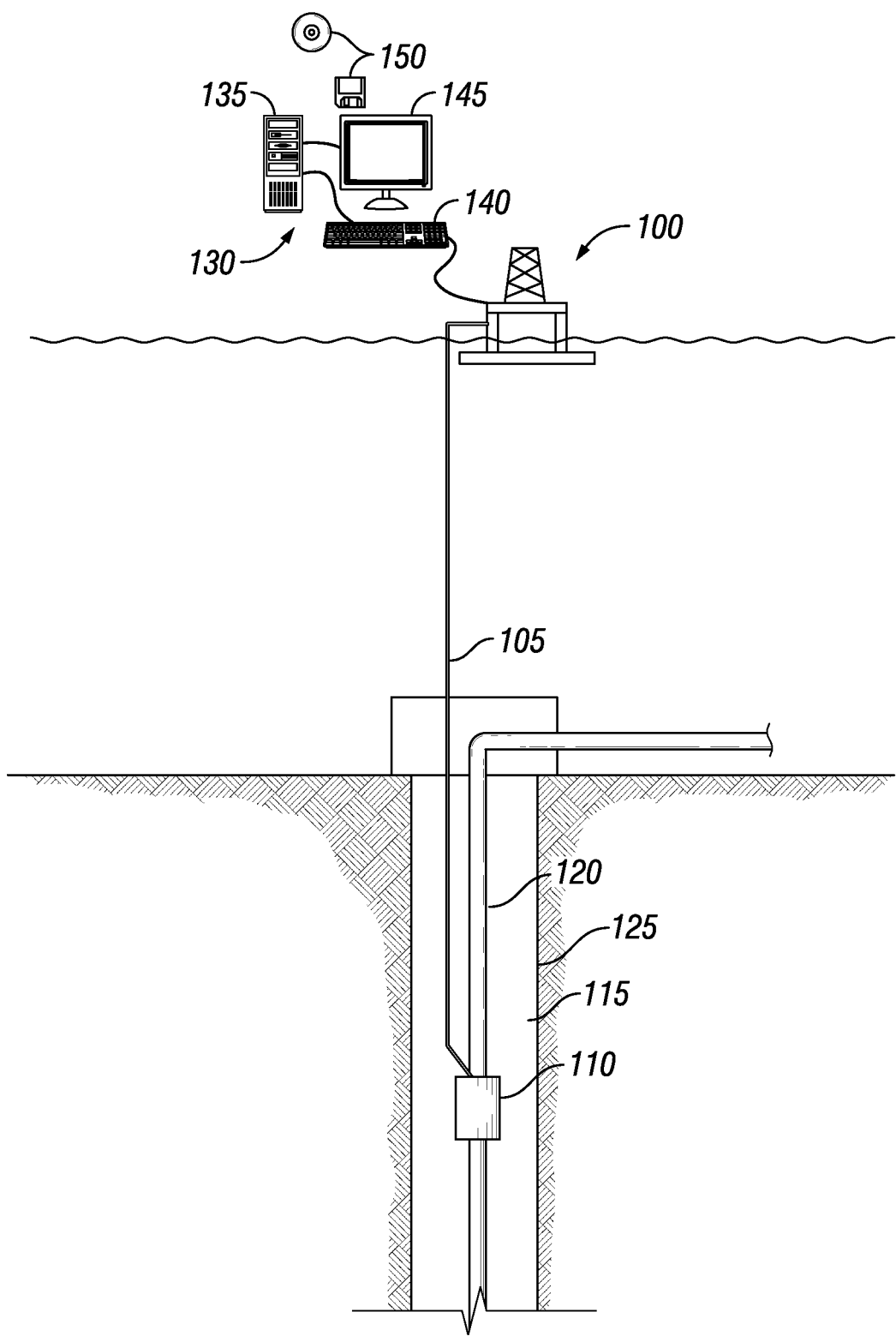
FIG. 1 illustrates an example of a tubing string with a safety valve.

FIG. 1 illustrates an offshore platform 100 connected to a safety valve 110 via a control line 105. An annulus 115 may be defined between walls of well 125 and a conduit 120. Conduit 120 may be any conduit such as a casing, liner, production tubing, tubing string, or other tubulars disposed in a wellbore. In the following description of the safety valve 110 and other apparatus and methods described herein, directional terms, such as "above" "below", "upper", "lower", etc., are used only for convenience in referring to the accompanying drawings. Additionally, it is to be understood that the various examples of the present safety valve described herein may be utilized in various orientations, such as inclined, inverted, horizontal, vertical, etc., and in various configurations, without departing from the principles of the present invention.

Safety valve 110 may be interconnected in conduit 120 and positioned in well 125. In examples, safety valve 110 may be disposed downhole to seal off conduit 120 from the flow of hydrocarbons. Although well 125, as depicted in FIG. 1, is an offshore well, one of ordinary skill in the art should be able to adopt the teachings herein to any type of well including onshore and/or offshore. Control line 105 may extend into well 125 and may be connected to safety valve 110. Control line 105 may be used to actuate safety valve 110, for example, to maintain safety valve 110 in an open position and to close safety valve 110 to prevent a blowout in the event of an emergency.

In an example, control line 105 may be a hydraulic control line providing hydraulic fluid. Pressure may be applied to control line 105 at a remote location, such as a production platform or a subsea control station, to maintain safety valve 110 in an open position. In FIG. 1, pressure may be applied to control line 105 at offshore platform 100. To close safety valve 110, pressure in control line 105 may be reduced. In another example, control line 105 may be capable of providing an electrical signal to safety valve 110. Safety valve 110 may comprise a linear actuator (not illustrated) configured to operate based off of the electrical signal provided by control line 105 to open and/or close safety valve 110. Although control line 105 is depicted in FIG. 1 as being external to conduit 120, it should be understood that control line 105 may be disposed at any suitable location to convey actuation pressure to safety valve 110. For example, control line 105 may be internal to conduit 120, or formed in a sidewall of conduit 120.

Systems and methods of the present disclosure may be implemented, at least in part, with an information handling system 130. Information handling system 130 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, information handling system 130 may be a processing unit 135, a network storage device, or any other suitable device and may vary in size, shape, performance, functionality, and price. Information handling system 130 may include random access memory (RAM), one or more processing resources such as a central processing unit (CPU) or hardware or software control logic, ROM, and/or other types of nonvolatile memory. Additional components of the information handling system 130 may include one or more disk drives, one or more network ports for communication with external devices as well as various input and output (I/O) devices, such as an input device 140 (e.g., keyboard, mouse, etc.) and a video display 145. Information handling system 130 may also include one or more buses operable to transmit communications between the various hardware components.

Alternatively, systems and methods of the present disclosure may be implemented, at least in part, with non-transitory computer-readable media 150. Non-transitory computer-readable media 150 may include any instrumentality or aggregation of instrumentalities that may retain data and/or instructions for a period of time. Non-transitory computer-readable media 150 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoin Referring to FIGS. 2-3, an example of safety valve 110 is shown in varying positions. FIG. 2 illustrates safety valve 110 in an open position. FIG. 3 illustrates safety valve 110 in a closed position. Safety valve 110 may comprise a first sub assembly 200 and a second sub assembly 205. In examples, second sub assembly 205 may be conduit 120 (e.g., shown on FIG. 1) or may be an intermediate tubular connecting first sub assembly 200 to conduit 120. First sub assembly 200 may comprise the internal components of safety valve 110 disposed within an outer housing 210 of first sub assembly 200. First sub assembly 200 may be affixed to an end 215 of second sub assembly 205, using any suitable mechanism, including, but not limited to, through the use of suitable fasteners, threading, adhesives, welding and/or any combination thereof. Without limitation, suitable fasteners may include nuts and bolts, washers, screws, pins, sockets, rods and studs, hinges and/or any combination thereof. As illustrated, a central bore 220 may be formed through outer housing 210 that provides a flow path through first sub assembly 200.

In examples, a flapper valve 225 may be disposed in the central bore 220 of outer housing 210. Flapper valve 225 may selectively open and close central bore 220. In examples, central bore 220 may extend axially through first sub assembly 200. Although flapper valve 225 is depicted, note that any suitable type of valve may be constructed to embody principles of the invention. Without limitation, flapper valve 225 may be another suitable valve member, such as a ball-type safety valve, or a sleeve-type safety valve, and others well known in the art. In examples, there may be a flapper assembly 230 that contains a hinge 235 that allows flapper valve 225 to rotate about a fixed point. Hinge 235 may be biased to force the flapper valve 225 to pivot to its open and/or closed position. Flapper assembly 230 may keep hinge 235 stationary in relation to first sub assembly 200. In examples, flapper assembly 230 may remain stationary by any suitable means.

Flapper assembly 230 may further comprise a seat 300, as best seen on FIG. 3. Flapper valve 225 may rotate about hinge 235 to set against seat 300 to seal off central bore 220. Seat 300 may be any suitable size, height, and/or shape that accommodates flapper valve 225. Without limitation, a suitable shape may include, but is not limited to, cross-sectional shapes that are circular, elliptical, triangular, rectangular, square, hexagonal, and/or combinations thereof. Seat 300 may be made from any suitable material. Suitable materials may include, but are not limited to, metals, non-metals, polymers, ceramics, and/or combinations thereof. In examples, seat 300 may be disposed at an end of a flow tube 240.

Flow tube 240 may also be disposed in central bore 220 of outer housing 210. Flow tube 240 may align with the inner diameter of safety valve 110. Without limitations, flow tube 240 may be any suitable tubular. In examples, flow tube 240 may comprise a protrusion 245. Protrusion 245 may be a projection of material from flow tube 240 that projects into the inner bore of outer housing 210. Protrusion 245 may be any suitable size, height, and/or shape. Without limitation, a suitable shape may include, but is not limited to, a cross-sectional shape that is circular, elliptical, triangular, rectangular, square, hexagonal, and/or combinations thereof.

As illustrated, a receptacle 250 may be formed in outer housing 210. In the illustrated example, receptacle 250 may be formed in an outer wall 255 of outer housing 210. Receptacle 250 may be configured to receive and house the actuating components of safety valve 110 within outer housing 210. To protect internal components of safety valve 110 from an external environment, receptacle 250 may be sleeved. As illustrated, a sleeve 260 may be disposed in receptacle 250 of outer housing 210. In examples, sleeve 260 may be disposed in receptacle 250 through the use of any suitable mechanism. Without limitation, any suitable mechanism may include, but is not limited to, the use of suitable fasteners, threading, adhesives, welding and/or any combination thereof. Without limitation, suitable fasteners may include nuts and bolts, washers, screws, pins, sockets, rods and studs, hinges and/or any combination thereof. In an alternate example, receptacle 250 may not be sleeved.

A control line port 265 may be provided for connecting control line 105 (e.g., referring to FIG. 1) to safety valve 110. Control line port 265 may be formed in sleeve 260. When control line 105 is connected to control line port 265, control line 105 may be placed in fluid communication with a piston 270. Although piston 270 is depicted with a single rod 275 in FIGS. 2-3, it should be understood that any type and any number of pistons may be used, such as multiple-rod pistons, or an annular piston, etc. In examples, piston 270 may be sealed against other components with non-elastomer dynamic seals (not shown). A downhole end 280 of piston 270 may be disposed about protrusion 245, and a spring 285 may bias piston 270 upwardly.

A means of actuating spring 285 with piston 270 may be provided with protrusion 245. As piston 270, and subsequently rod 275, displaces downwards, rod 275 may push against protrusion 245. If the pressure supplied by control line 105 is greater than the upwardly biasing force of spring 285, protrusion 245 may displace downwards a given distance, thereby compressing spring 285. If the pressure supplied by control line 105 is less than the upwardly biasing force of spring 285, there may not be enough force to actuate protrusion 245 downwards to compress spring 285. If the pressure supplied by control line 105 is less than the upwardly biasing force of spring 285 while spring 285 is compressed, spring 285 may cause protrusion 245 to displace upwards, thereby displacing rod 275 upwards as well. As protrusion 245 is displaced, flow tube 240 may move in relation to the distance traveled by protrusion 245

In examples, the operation of piston 270 may actuate flapper valve 225. As illustrated in FIG. 2, flapper valve 225 may be disposed in a cavity 290 formed by outer housing 210 and flow tube 240. This may be designated as an open position for safety valve 110 as flapper valve 225 is not obstructing the potential flow of material through central bore 220, as illustrated in FIG. 2. As flow tube 240 displaces upwards and downwards within safety valve 110, the size and/or shape of cavity 290 may change. In examples, a closed position of flapper valve 225 may be designated as when flapper valve 225 is perpendicular to central bore 220, as illustrated in FIG. 3, wherein flapper valve 225 prevents the flow of material through central bore 220. To actuate safety valve 110 from a closed position to an open position, pressure may be applied to piston 270 to move protrusion 245 and flow tube 240 downwards, thereby causing flapper valve 225 to return to cavity 290 to allow material to flow through central bore 220.

Figure 4:
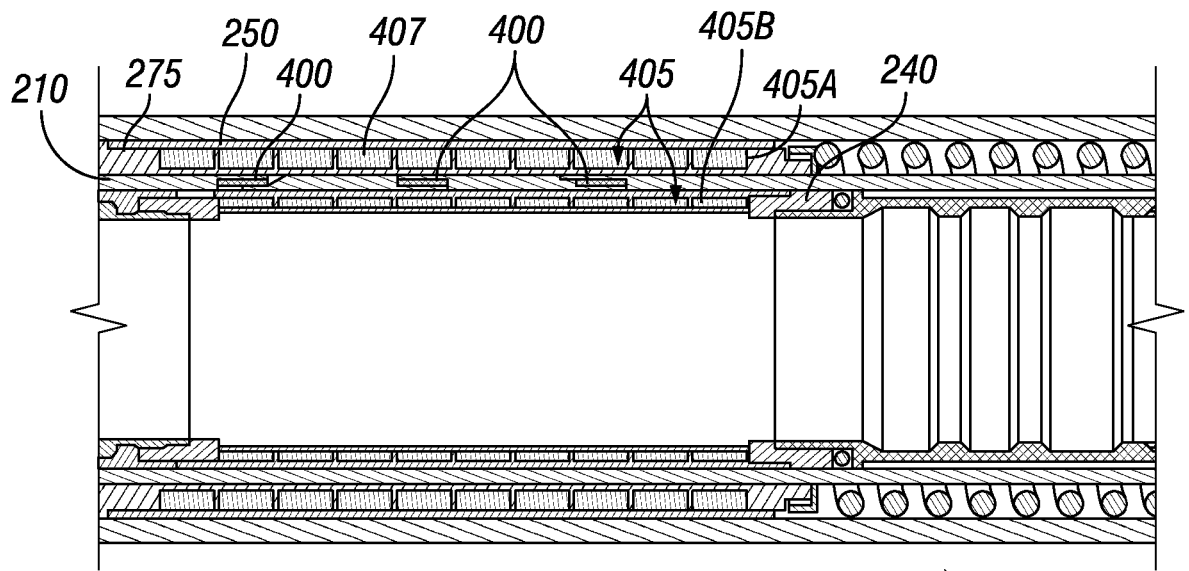
FIG. 4 illustrates an example of a safety valve in a closed position with a magnetic sensor.
Figure 5:
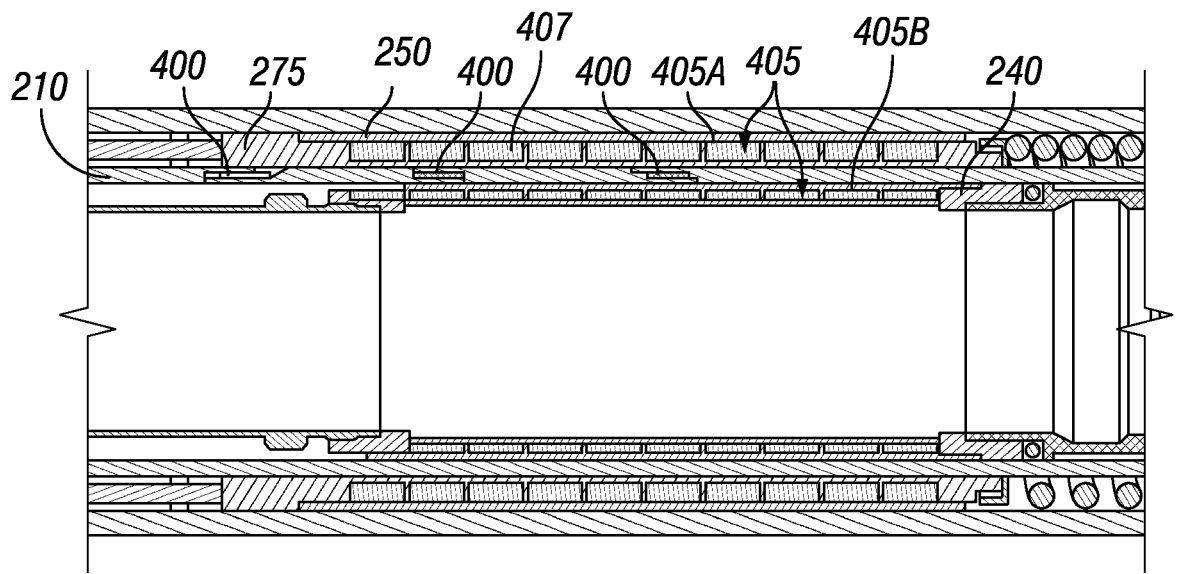
FIG. 5 illustrates an example of a safety valve in a mid-stroke position with a magnetic sensor.

Often, the only indicator of the position of flow tube 240 during actuation may be a sudden pressure spike when flow tube 240 bottoms out (i.e., is fully open). In examples, it may be beneficial to determine the location of flow tube 240 as it displaces within safety valve 110. FIGS. 4-6 illustrate an example using magnets to determine the position of flow tube 240 within safety valve 110. FIG. 4 illustrates safety valve 110 in a closed position. FIG. 5 illustrates safety valve 110 in a mid-stroke position. FIG. 6 illustrates safety valve 110 in an open position.

As illustrated, safety valve 110 may comprise a magnetic sensor 400 and a magnetic sleeve 405. Magnetic sensor 400 may be used to measure a magnetic field. Magnetic sensor 400 may be any suitable size, height, and/or shape. Without limitation, a suitable shape may include, but is not limited to, a cross-sectional shape that is circular, elliptical, triangular, rectangular, square, hexagonal, and/or combinations thereof. Magnetic sensor 400 may be made from any suitable material. Suitable materials may include, but are not limited to, metals, nonmetals, polymers, ceramics, and/or combinations thereof. Without limitation, any suitable type of sensor capable of measuring a magnetic field may be used as magnetic sensor 400. In examples, magnetic sensor 400 may be a Hall effect sensor or a reed switch. Magnetic sensor 400 may be disposed within outer housing 210 at any suitable location. In examples, there may be a plurality of magnetic sensors 400. As illustrated, the plurality of magnetic sensors 400 may be disposed on a portion of outer housing 210 between receptacle 250 and flow tube 240. The plurality of magnetic sensors 400 may be disposed in recesses of internal and/or external surfaces of outer housing 210. In alternate embodiments, the plurality of magnetic sensors 400 may be disposed on internal and/or external surfaces of outer housing 210 and may protrude outwards from those surfaces. In further embodiments, the plurality of magnetic sensors 400 may be disposed within a suitable location in outer housing 210. The plurality of magnetic sensors 400 may be used to track the position of a nearby magnetic sleeve 405 as the magnetic sleeve displaces axially throughout safety valve 110 by measuring the magnetic field of the magnetic sleeve 405.

In embodiments, magnetic sleeve 405 may be a sleeve comprising a plurality of magnets 407. The plurality of magnets 407 may be spaced apart at any suitable distance and may be any suitable size, height, and/or shape. In other embodiments, the plurality of magnets 407 may be directly disposed within safety valve 110 by any suitable fastening mechanism other than employing a sleeve. The plurality of magnets 407 may be disposed into recesses of internal and/or external surfaces of safety valve 110. In alternate embodiments, the plurality of magnets 407 may be disposed on internal and/or external surfaces of safety valve 110 and may protrude outwards from those surfaces. In further embodiments, the plurality of magnets 407 may be disposed within a suitable location in outer housing 210 of safety valve 110.

Concerning the present disclosure, safety valve 110 may employ magnetic sleeve 405. As illustrated, there may be a magnetic sleeve 405 disposed on rod 275 and/or flow tube 240. Magnetic sleeve 405 may be disposed around rod 275 and/or flow tube 240 using any suitable mechanism, including, but not limited to, through the use of suitable fasteners, threading, adhesives, welding and/or any combination thereof. Without limitation, suitable fasteners may include nuts and bolts, washers, screws, pins, sockets, rods and studs, hinges and/or any combination thereof. Magnetic sleeve 405 may actively and/or passively produce a magnetic field. Magnetic sleeve 405 may be any suitable size, height, and/or shape. Without limitation, a suitable shape may include, but is not limited to, a cross-sectional shape that is circular, elliptical, triangular, rectangular, square, hexagonal, and/or combinations thereof. In examples, magnetic sleeve 405 may be in the shape of a hollow tubular. Magnetic sleeve 405 may be made from any suitable material. Suitable materials may include, but are not limited to, metals, nonmetals, polymers, ceramics, and/or combinations thereof.

During operations, a first magnetic sleeve 405A may be disposed around rod 275 and may be displaced accordingly as rod 275 is displaced. First magnetic sleeve 405A may produce a magnetic field that interacts with a second magnetic sleeve 405B disposed within flow tube 240. In examples, first magnetic sleeve 405A and second magnetic sleeve 405B may have opposing polarities. As first magnetic sleeve 405A displaces axially near second magnetic sleeve 405B, second magnetic sleeve 405B may also displace due to the magnetic attraction between first magnetic sleeve 405A and second magnetic sleeve 405B.

As illustrated, the plurality of magnetic sensors 400 may be disposed within outer housing 210 between rod 275 and flow tube 240. As both rod 275 and flow tube 240 displace axially due to the magnetic attraction between first magnetic sleeve 405A and second magnetic sleeve 405B, the plurality of magnetic sensors 400 may operate to receive the magnetic field produced by first magnetic sleeve 405A and/or second magnetic sleeve 405B. Each one of the plurality of magnetic sensors 400 may be disposed a pre-defined length from each other. In embodiments, the plurality of magnetic sensors 400 may be disposed equidistant from each other. As the first magnetic sleeve 405A and second magnetic sleeve 405B displace axially, a portion of the plurality of magnetic sensors 400 may be receiving a magnetic field, and the remaining portion of the plurality of magnetic sensors 400 may not be receiving a magnetic field. In certain embodiments, first magnetic sleeve 405A and second magnetic sleeve 405B may need to be directly in line with a singular magnetic sensor 400 in order for that magnetic sensor 400 to be actuated to receive a magnetic field. In other embodiments, the singular magnetic sensor 400 may be triggered to receive a magnetic field when first magnetic sleeve 405A and second magnetic sleeve 405B are a certain distance away from that magnetic sensor 400. Without limitations, that certain distance may be from about half an inch to about five inches.

Each one of the plurality of magnetic sensors 400 may comprise suitable electronics to process and/or convey signals to information handling system 130 (i.e., referring to FIG. 1). In examples, each one of the plurality of magnetic sensors 400 may comprise a control module configured to process incoming signals and convey those signals. In other examples, there may be a central control module coupled to each one of the plurality of magnetic sensors 400, wherein the central control module is configured to operate each one of the plurality of magnetic sensors 400, process incoming signals to each one of the plurality of magnetic sensors 400, and convey those signals uphole. Any suitable technique may be used for transmitting signals from safety valve 110 to information handling system 130, including, but not limited to, wired pipe telemetry, mud-pulse telemetry, acoustic telemetry, and electromagnetic telemetry. The signals may then be analyzed and processed by information handling system 130.

In alternate examples, safety valve 110 may use other suitable sensors to determine the position of flow tube 240 within safety valve 110. FIGS. 7-8 illustrate examples using a piezoelectric sensor to determine the position of flow tube 240 within safety valve 110. FIG. 7 illustrates safety valve 110 in an open position with a piezoelectric sensor in second sub assembly 205. FIG. 8 illustrates safety valve 110 in a bottomed-out position actuating the piezoelectric sensor in second sub assembly 205.

Safety valve 110 may further comprise a piezoelectric sensor 700. Piezoelectric sensor 700 may be used to correlate the change in strain due to an applied force to an electrical signal (i.e., voltage). Piezoelectric sensor 700 may be any suitable size, height, and/or shape. Without limitation, a suitable shape may include, but is not limited to, a cross-sectional shape that is circular, elliptical, triangular, rectangular, square, hexagonal, and/or combinations thereof. Piezoelectric sensor 700 may be made from any suitable material. Suitable materials may include, but are not limited to, metals, nonmetals, polymers, ceramics, and/or combinations thereof. Without limitation, any suitable type of piezoelectric sensor may be used. In examples, piezoelectric sensor 700 may generally be a piezoelectric disc that generates a voltage when deformed. Piezoelectric sensor 700 may be disposed within and/or on safety valve 110 at any suitable location. In examples, piezoelectric sensor 700 may be disposed within first sub assembly 200 and/or second sub assembly 205. In some examples, there may be a plurality of piezoelectric sensors 700.

As illustrated in FIGS. 7-8, piezoelectric sensor 700 may be disposed at end 215 of second sub assembly 205. End 215 may comprise an internal shoulder 705 that flow tube 240 may be seated against when displaced within safety valve 110. During operations, flow tube 240 may displace axially within safety valve 110 to seat against internal shoulder 705. As flow tube 240 seats against internal shoulder 705, pressure may be applied to piezoelectric sensor 700 to actuate piezoelectric sensor 700. Piezoelectric sensor 700 may comprise suitable electronics to convert the change in strain that it experiences into an electrical signal (i.e., voltage) and/or to convey the electrical signal to information handling system 130 (i.e., referring to FIG. 1). In examples, piezoelectric sensor 700 may comprise a control module configured to operate piezoelectric sensor 700 for processing and conveying signals. These signals may indicate whether or not flow tube 240 has seated against internal shoulder 705, and thus opening safety valve 110.

Figure 9:
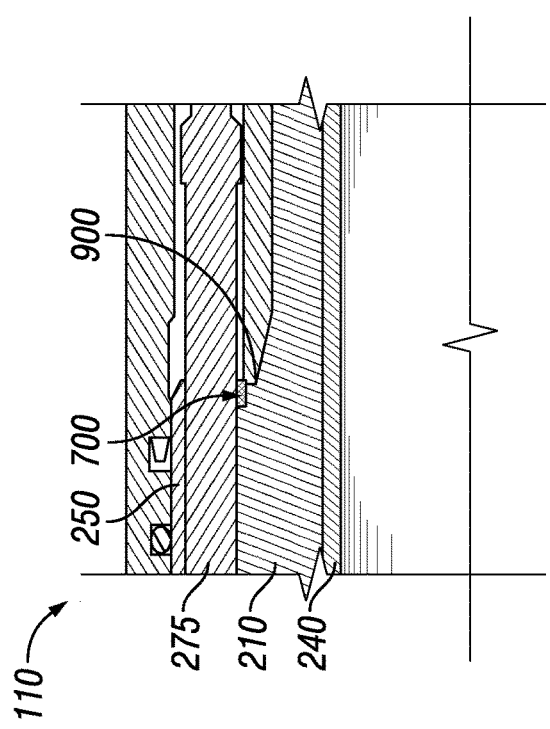
FIG. 9 illustrates an example of a safety valve in a closed position actuating a piezoelectric sensor in a first sub assembly.
Figure 10:
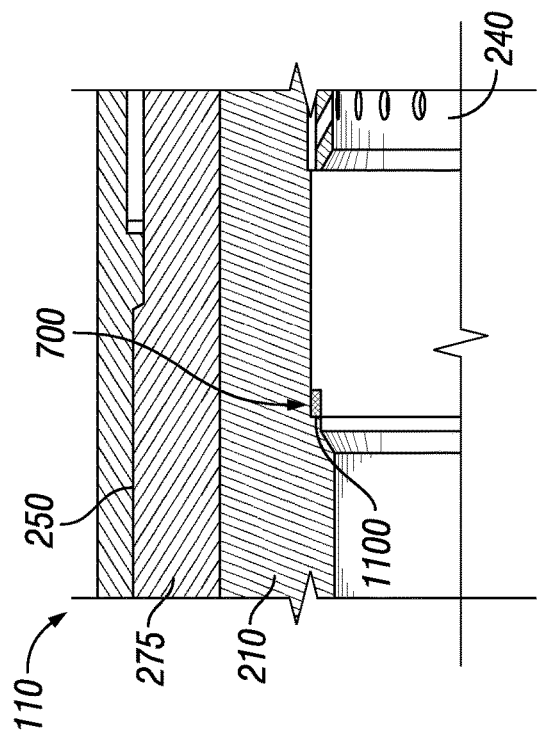
FIG. 10 illustrates an example of a safety valve in a mid-stroke position with a piezoelectric sensor in a first sub assembly.
Figure 11:
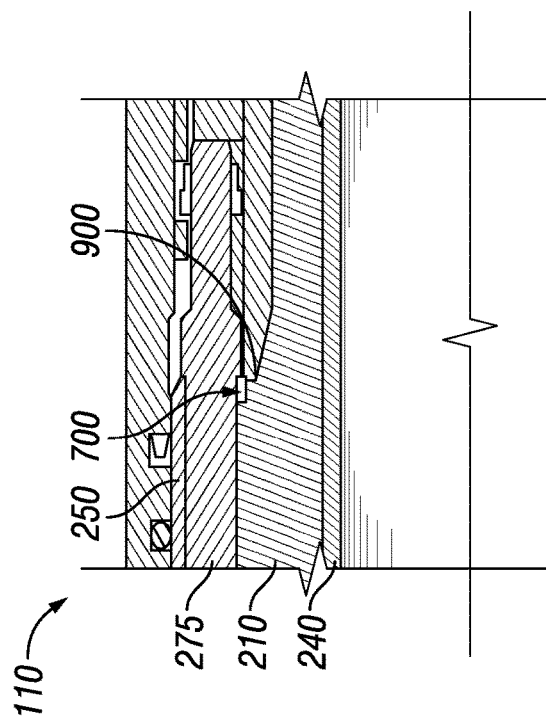
FIG. 11 illustrates an example of a safety valve in a closed position actuating a piezoelectric sensor in a first sub assembly.
Figure 12:
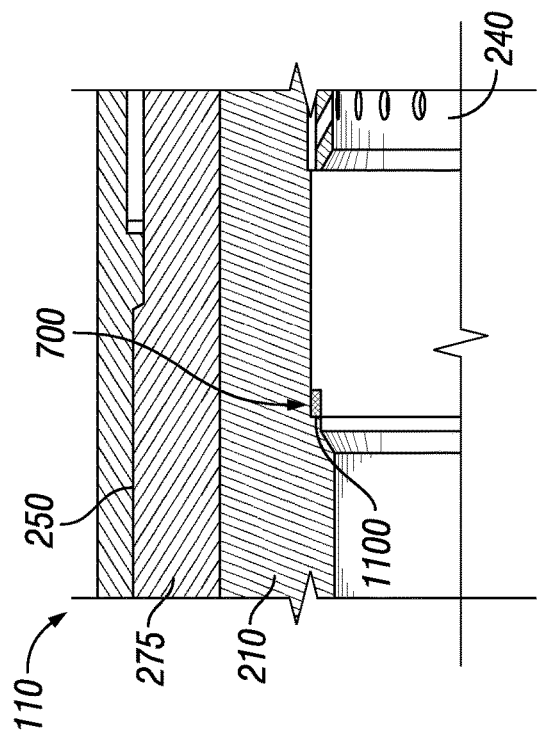
FIG. 12 illustrates an example of a safety valve in a mid-stroke position with a piezoelectric sensor in a first sub assembly.

FIGS. 9-12 illustrate examples wherein piezoelectric sensor 700 is disposed in first sub assembly 200. FIG. 9 illustrates safety valve 110 in a closed position actuating piezoelectric sensor 700 in first sub assembly 200. FIG. 10 illustrates safety valve 110 in a mid-stroke position with piezoelectric sensor 700 in first sub assembly 200. FIG. 11 illustrates safety valve 110 in a closed position actuating piezoelectric sensor 700 in first sub assembly 200. FIG. 12 illustrates safety valve 110 in a mid-stroke position with piezoelectric sensor 700 in first sub assembly 200. As illustrated in FIGS. 9-12, piezoelectric sensor 700 may be disposed within a portion of outer housing 210 between receptacle 250 and flow tube 240. In some examples, piezoelectric sensor 700 may be disposed at a first housing shoulder 900 that faces receptacle 250. As rod 275 displaces through safety valve 110, rod 275 may seat against first housing shoulder 900 to abut against piezoelectric sensor 700 when closing safety valve 110. As rod 275 seats against first housing shoulder 900, pressure may be applied to piezoelectric sensor 700 to actuate piezoelectric sensor 700. Piezoelectric sensor 700 may produce a signal, and the signal may indicate whether or not rod 275 has seated against first housing shoulder 900, and thus closing safety valve 110.

In other examples, piezoelectric sensor 700 may be disposed at a second housing shoulder 1100 that faces flow tube 240. As flow tube 240 displaces through safety valve 110, flow tube 240 may seat against second housing shoulder 1100 to abut against piezoelectric sensor 700 when closing safety valve 110. As flow tube 240 seats against second housing shoulder 1100, pressure may be applied to piezoelectric sensor 700 to actuate piezoelectric sensor 700. Piezoelectric sensor 700 may produce a signal, and the signal may indicate whether or not flow tube 240 has seated against second housing shoulder 1100, and thus closing safety valve 110.

Accordingly, this disclosure describes systems, methods, and apparatuses that may relate to the improvement of safety valves. The systems, methods, and apparatus may further be characterized by one or more of the following statements.

Statement 1. A well safety valve, comprising: a first sub assembly, wherein the first sub assembly comprises: an outer housing having a central bore extending axially through the outer housing, wherein the outer housing comprises an outer wall having a receptacle formed in the outer wall; a piston disposed in the receptacle, wherein the piston is actuable to travel longitudinally in the receptacle; a rod, wherein the rod is disposed at an end of the piston, wherein a first magnetic sleeve is disposed around the rod; a flow tube disposed in the central bore of the outer housing, wherein the flow tube comprises a second magnetic sleeve on an exterior surface of the flow tube, wherein the flow tube is operable to move in response to movement of the piston; and a valve member disposed in the outer housing, wherein the valve member is operable to selectively restrict flow through the well safety valve in response to movement of the flow tube; and one or more magnetic sensors disposed in the outer housing between the first magnetic sleeve and the second magnetic sleeve; and a second sub assembly, wherein the second sub assembly is coupled to the first sub assembly.

Statement 2. The well safety valve of statement 1, wherein the valve member comprises a flapper valve.

Statement 3. The well safety valve of statement 2, further comprising a flapper assembly, wherein the flapper assembly comprises a hinge, wherein the flapper valve rotates about the hinge.

Statement 4. The well safety valve of any of the previous statements, wherein the one or more magnetic sensors comprises a plurality of magnetic sensors spaced longitudinally in the outer housing between the piston and the flow tube.

Statement 5. The well safety valve of statement 4, wherein the plurality of magnetic sensors are disposed equidistant from each other.

Statement 6. The well safety valve of statement 4, further comprising a control module in signal communication each one of the plurality of magnetic sensors, wherein the control module is configured to: operate each one of the plurality of magnetic sensors to receive a nearby magnetic field as a signal; process the signal; and convey the signals uphole to an information handling system.

Statement 7. The well safety valve of statement 4, further comprising a plurality of control modules, wherein each individual one of the plurality of control modules is coupled to an individual one of the plurality of magnetic sensors, wherein each control module is configured to: operate the individual one of the magnetic sensors to receive a nearby magnetic field as a signal; process the signal; and convey the signals uphole to an information handling system.

Statement 8. The well safety valve of any of the previous statements, wherein the one or more magnetic sensors are selected from the group consisting of a Hall effect sensor and a reed switch.

Statement 9. A method of monitoring a position of a flow tube in a safety valve, comprising: displacing a piston and a rod, wherein the rod is coupled to the piston, wherein a receptacle is formed in an outer wall of an outer housing of the safety valve, wherein the piston and the rod are disposed within the receptacle; displacing a flow tube in response to the displacement of the piston and the rod; monitoring the position of the flow tube with at least one of one or more magnetic sensors or a piezoelectric sensor; and actuating a valve member.

Statement 10. The method of statement 9, wherein displacing the piston and the rod is in response to a change in hydraulic pressure provided to the safety valve from a surface of a wellbore.

Statement 11. The method of statement 9 or 10, wherein displacing the piston and the rod is in response to an electrical signal provided to the safety valve from a surface of a wellbore.

Statement 12. The method of any of statements 9 to 11, wherein the safety valve comprises a first sub assembly coupled to a second sub assembly, wherein the piezoelectric sensor is disposed at an internal shoulder of an end of the second sub assembly, and further comprising seating the flow tube against the piezoelectric sensor.

Statement 13. The method of any of statements 9 to 12, wherein the safety valve comprises an outer housing having a central bore extending axially through the outer housing, wherein the outer housing comprises an outer wall having a receptacle formed in the outer wall, wherein the piezoelectric sensor is disposed within a portion of the outer housing between the receptacle and the flow tube, and further comprising seating the rod against the piezoelectric sensor.

Statement 14. The method of any of statements 9 to 13, wherein the safety valve comprises an outer housing having a central bore extending axially through the outer housing, wherein the outer housing comprises an outer wall having a receptacle formed in the outer wall, wherein the one or more magnetic sensors are disposed within a portion of the outer housing between the receptacle and the flow tube, and further comprising measuring a magnetic field produced by a first magnetic sleeve disposed on the rod and a second magnetic sleeve disposed on the flow tube with the magnetic sensor.

Statement 15. A well safety valve, comprising: a first sub assembly, wherein the first sub assembly comprises: an outer housing having a central bore extending axially through the outer housing, wherein the outer housing comprises an outer wall having a receptacle formed in the outer wall; a piston disposed in the receptacle, wherein the piston is actuable to travel longitudinally in the receptacle; a rod, wherein the rod is disposed at an end of the piston; a flow tube disposed in the central bore of the outer housing, wherein the flow tube is operable to move in response to movement of the piston; and a valve member disposed in the outer housing, wherein the valve member is operable to selectively restrict flow through the well safety valve in response to movement of the flow tube; a second sub assembly, wherein the second sub assembly is coupled to the first sub assembly; and a piezoelectric sensor positioned to measure a position of the flow tube in the well safety valve.

Statement 16. The well safety valve of statement 15, wherein the piezoelectric sensor is disposed at an internal shoulder of an end of the second sub assembly.

Statement 17. The well safety valve of statement 16, wherein the piezoelectric sensor is configured to be actuated by displacement of the flow tube, wherein the flow tube is able to seat against the piezoelectric sensor.

Statement 18. The well safety valve of any of statements 15 to 17, wherein the piezoelectric sensor is disposed within a portion of the outer housing between the receptacle and the flow tube.

Statement 19. The well safety valve of statement 18, wherein the piezoelectric sensor is configured to be actuated by displacement of the rod, wherein the rod is able to seat against the piezoelectric sensor.

Statement 20. The well safety valve of any of statements 15 to 19, wherein the piezoelectric sensor comprises a control module, wherein the control module is configured to: convert a change in strain due to an applied force to an electrical signal; and convey the electrical signal uphole to an information handling system.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A well safety valve, comprising:
    a first sub assembly, wherein the first sub assembly comprises:
        an outer housing having a central bore extending axially through the outer housing, wherein the outer housing comprises an outer wall having a receptacle formed in the outer wall;
    a piston disposed in the receptacle, wherein the piston is actuable to travel longitudinally in the receptacle;
    a rod, wherein the rod is disposed at an end of the piston, wherein a first magnetic sleeve is disposed around the rod, the first magnetic sleeve comprising a solid annular cross-section;
    a flow tube disposed in the central bore of the outer housing, wherein the flow tube comprises a second magnetic sleeve on an exterior surface of the flow tube, wherein the flow tube is operable to move in response to movement of the piston;
    a valve member disposed in the outer housing, wherein the valve member is operable to selectively restrict flow through the well safety valve in response to movement of the flow tube; and
    one or more magnetic sensors disposed in the outer housing between the first magnetic sleeve and the second magnetic sleeve; and
    a second sub assembly, wherein the second sub assembly is coupled to the first sub assembly.

2. The well safety valve of claim 1, wherein the valve member comprises a flapper valve.

3. The well safety valve of claim 2, further comprising a flapper assembly, wherein the flapper assembly comprises a hinge, wherein the flapper valve rotates about the hinge.

4. The well safety valve of claim 1, wherein the one or more magnetic sensors comprises a plurality of magnetic sensors spaced longitudinally in the outer housing between the piston and the flow tube.

5. The well safety valve of claim 4, wherein the plurality of magnetic sensors are disposed equidistant from each other.

6. The well safety valve of claim 4, further comprising a control module in signal communication each one of the plurality of magnetic sensors, wherein the control module is configured to:
    operate each one of the plurality of magnetic sensors to receive a nearby magnetic field as a signal;
    process the signal; and
    convey the signals uphole to an information handling system.

7. The well safety valve of claim 4, further comprising a plurality of control modules, wherein each individual one of the plurality of control modules is coupled to an individual one of the plurality of magnetic sensors, wherein each control module is configured to:
    operate the individual one of the magnetic sensors to receive a nearby magnetic field as a signal;
    process the signal; and
    convey the signals uphole to an information handling system.

8. The well safety valve of claim 1, wherein the one or more magnetic sensors are selected from the group consisting of a Hall effect sensor and a reed switch.

9. A method of monitoring a position of a flow tube in a safety valve, comprising:
    displacing a piston and a rod, wherein the rod is coupled to the piston, wherein a receptacle is formed in an outer wall of an outer housing of the safety valve, wherein the piston and the rod are disposed within the receptacle;
    displacing a flow tube, with a first magnetic sleeve comprising a solid annular cross-section, in response to the displacement of the piston and the rod;
    monitoring the position of the flow tube with at least one of one or more magnetic sensors or a piezoelectric sensor; and
    actuating a valve member.

10. The method of claim 9, wherein displacing the piston and the rod is in response to a change in hydraulic pressure provided to the safety valve from a surface of a wellbore.

11. The method of claim 9, wherein displacing the piston and the rod is in response to an electrical signal provided to the safety valve from a surface of a wellbore.

12. The method of claim 9, wherein the safety valve comprises a first sub assembly coupled to a second sub assembly, wherein the piezoelectric sensor is disposed at an internal shoulder of an end of the second sub assembly, and further comprising seating the flow tube against the piezoelectric sensor.

13. The method of claim 9, further comprising seating the rod against the piezoelectric sensor.

14. The method of claim 9, further comprising measuring a magnetic field produced by a first magnetic sleeve disposed on the rod and a second magnetic sleeve disposed on the flow tube with the magnetic sensor.

15. A well safety valve comprising:
    a first sub assembly, wherein the first sub assembly comprises:
        an outer housing having a central bore extending axially through the outer housing, wherein the outer housing comprises an outer wall having a receptacle formed in the outer wall;
    a piston disposed in the receptacle, wherein the piston is actuable to travel longitudinally in the receptacle;
    a rod disposed at an end of the piston, wherein a first magnetic sleeve is disposed around the rod, the first magnetic sleeve comprising a solid annular cross-section;

a flow tube disposed in the central bore of the outer housing, wherein the flow tube is operable to move in response to movement of the piston; and a valve member disposed in the outer housing, wherein the valve member is operable to selectively restrict flow through the well safety valve in response to movement of the flow tube;

a second sub assembly, wherein the second sub assembly is coupled to the first sub assembly; and a piezoelectric sensor positioned to measure a position of the flow tube in the well safety valve.

16. The well safety valve of claim 15, wherein the piezoelectric sensor is disposed at an internal shoulder of an end of the second sub assembly.

17. The well safety valve of claim 16, wherein the piezoelectric sensor is configured to be actuated by displacement of the flow tube, wherein the flow tube is able to seat against the piezoelectric sensor.

18. The well safety valve of claim 15, wherein the piezoelectric sensor is disposed within a portion of the outer housing between the receptacle and the flow tube.

19. The well safety valve of claim 18, wherein the piezoelectric sensor is configured to be actuated by displacement of the rod, wherein the rod is able to seat against the piezoelectric sensor.

20. The well safety valve of claim 15, wherein the piezoelectric sensor comprises a control module, wherein the control module is configured to:

convert a change in strain due to an applied force to an electrical signal; and convey the electrical signal uphole to an information handling system.

* * * * *